United States Patent [19]

Ito et al.

[11] Patent Number: 4,915,916

[45] Date of Patent: Apr. 10, 1990

[54] METHOD OF AND APPARATUS FOR TREATING WASTE GAS BY IRRADIATION WITH ELECTRON BEAM

[75] Inventors: Kanichi Ito; Akihiko Maezawa, both of Yokohama, Japan

[73] Assignee: Ebara Corporation, Tokyo, Japan

[21] Appl. No.: 264,848

[22] Filed: Oct. 31, 1988

Related U.S. Application Data

[63] Continuation-in-part of Ser. No. 265,453, filed as PCT JP87/00259 on Apr. 23, 1987, published as WO87/06494 on Nov. 5, 1987.

[30] Foreign Application Priority Data

Apr. 24, 1986 [JP] Japan .................................. 61-95666

[51] Int. Cl.$^4$ .................. B01J 19/08; B01J 19/12; A21K 27/02
[52] U.S. Cl. .................. 422/186; 204/157.3; 204/157.46; 204/157.49; 250/435; 250/492.3; 422/904
[58] Field of Search ............ 204/157.22, 157.61, 204/157.63, 157.64, 157.41, 157.44, 157.46, 157.49, 157.5, 157.3; 252/647, 626; 422/186, 904, 903; 250/435, 492.3

[56] References Cited

U.S. PATENT DOCUMENTS

| | | | |
|---|---|---|---|
| 3,869,362 | 3/1975 | Machi et al. | 204/157.44 |
| 3,981,815 | 9/1976 | Taniguchi et al. | 204/157.46 |
| 3,997,415 | 12/1976 | Machi et al. | 204/157.46 |
| 4,097,349 | 6/1978 | Zenty | 204/157.46 |
| 4,110,183 | 8/1978 | Furuta et al. | 204/157.41 |
| 4,175,016 | 11/1979 | Lewis et al. | 204/157.44 |
| 4,294,674 | 10/1981 | Aoki et al. | 204/157.1 H |
| 4,372,832 | 2/1983 | Bush | 204/157.44 |
| 4,406,762 | 9/1983 | Ray et al. | 204/157.41 |
| 4,435,260 | 3/1984 | Koichi et al. | 204/164 |
| 4,595,579 | 6/1986 | Prudhon et al. | 204/157.41 |
| 4,702,808 | 10/1987 | Lemelson | 204/157.41 |

FOREIGN PATENT DOCUMENTS

| | | |
|---|---|---|
| 3608291 | 4/1987 | Fed. Rep. of Germany . |
| 3622621 | 1/1988 | Fed. Rep. of Germany . |
| 49-96975 | 9/1974 | Japan . |
| 51-8636 | 3/1976 | Japan . |
| 55-97232 | 7/1980 | Japan . |
| 57-7231 | 1/1982 | Japan . |
| 61-68126 | 4/1986 | Japan . |
| 8706494 | 11/1987 | World Int. Prop. O. . |

Primary Examiner—Howard J. Locker
Attorney, Agent, or Firm—Oblon, Spivak, McClelland, Maier & Neustadt

[57] ABSTRACT

A method and apparatus for treating waste gas by irradiation with electron beams wherein an electron beam irradiation chamber for irradiation with electron beams from an electron beam accelerator is provided in the communication with a main duct containing waste gas. A part of the waste gas to be treated is introduced into the electron beam irradiation chamber where the part of the waste gas is irradiated with electron beams, thereby to form active species such as O and OH radicals. The waste gas having the active species formed therein is fed into the waste gas main duct by means of a feeding device and is dispersed into and mixed with the waste gas flowing through the main duct by means of a dispersing device, thereby changing noxious (gas) ingredients in the waste gas into the form of a mist or dust by the action of the active species. The mist or dust is captured by means of a capturing device, for example, a dust collector.

5 Claims, 3 Drawing Sheets

METHOD OF AND APPARATUS FOR TREATING WASTE GAS BY IRRADIATION WITH ELECTRON BEAM

CROSS REFERENCE TO RELATED APPLICATIONS

This application is a continuation-in-part of pending U.S. application Ser. No. 07/265,453 filed as PCT JP87/00259 on Apr. 23, 1987, published as WO87/06494 on Nov. 5, 1987, with the same title and by the same inventors.

BACKGROUND OF THE INVENTION

1. Field of the Invention

This invention relates to a method of and apparatus for treating waste gas wherein waste gas containing noxious (gas) ingredients such as $SO_2$ and $NO_x$ are irradiated with electron beams to change the noxious (gas) ingredients into the form of mist (sulfuric acid and/or nitric acid) or dust (ammonium sulfate and/or ammonium nitrate) and the resulting mist or dust is then captured with a dust collector or the like.

2. Discussion of the Background

One method of waste gas treatment whereby noxious gas) ingredients such as $SO_2$ and $NO_x$ are removed from waste gases is a method wherein waste gas is irradiated with electron beams to form various active species such as O and OH radicals from oxygen, water, etc. in the waste gas so that the active species act on on the noxious (gas) ingredients in the waste gas such as to form mist and this mist is further changed into dust in the presence of ammonia or the like, the mist and dust then being captured with a dust collector or the like.

FIG. 1 schematically shows the structure of an electron beam irradiation portion of a waste gas treatment apparatus for carrying out this waste gas treatment method. As illustrated, a waste gas duct 1 is provided with irradiation windows 2, and waste gas passing through the waste gas duct 1 is directly irradiated with electron beams 4 emitted from electron beam accelerators 3 through the irradiation window 2. In the structure wherein the electron beams 4 are directly applied to the inside of the waste gas duct 1, when the amount of waste gas increases to that which would be treated in a practical application and the size of the waste gas duct 1 increases correspondingly, it has heretofore been necessary, in order to allow all of the waste gas to absorb the electron beams 4, to dispose a multiplicity of electron beam accelerators 3 (two in the illustrated example) at the outer periphery of the waste gas duct 1 and also to increase the maximum range of the electron beams 4, as shown by the chain lines 5. However, disposition of a multiplicity of electron beam accelerators 3 is disadvantageous in that the structure of the waste gas treating apparatus becomes complicated and cost is increased. Further, in order to increase the maximum range of the electron beams 4, it is necessary to raise the acceleration voltage for electron beams, which leads to a substantial rise in the cost of the electron beam accelerators 3. In addition, if electron beams are accelerated at high voltages, high-energy X-rays are generated and a thick lead or concrete wall or the like must be provided in order to provide shielding from such high-energy X-rays, which results in a rise in the overall cost of the waste gas treatment apparatus. Thus, the prior art suffers from various problems.

The following Table 1 shows the relationship between the maximum range of the electron beams according to the acceleration voltage therefor, the size of an electron beam irradiation chamber, the flow rate of waste gas and the thickness of a lead wall providing shielding from high-energy X-rays.

TABLE 1

| Accelerating voltage (KV) | Maximum range of electron beam in waste gas (m) | Size of electron beam chamber (diameter, m) | Flow rate of waste gas ($m^3$/h) | Thickness of lead wall (mm) |
| --- | --- | --- | --- | --- |
| 1000 | 4.3 | 4.4 | $5 \times 10^5$ | 257 |
| 800 | 3.1 | 3.2 | $2.5 \times 10^5$ | 170 |
| 500 | 1.6 | 1.7 | $6 \times 10^4$ | 90 |
| 300 | 0.8 | 0.9 | $2 \times 10^4$ | 34 |
| 200 | 0.46 | 0.5 | $0.7 \times 10^4$ | 13 |

The above-mentioned Table 1 shows an example of the maximum range of electron beams and the size of the electron beam irradiation chamber which are necessary to allow the waste gas to absorb the electron beams, whereby the amount of waste gas capable of being treated and the thickness of the lead wall for shielding against X-rays, i.e. the size of the shielding structure, are determined. These are necessary conditions for the shielding against X-rays. In order to treat noxious gas ingredients such as $SO_2$ and $NO_x$, a suitable level of electron beam energy (accelerating voltage x amperage) is necessary. However, the amperage is not an important factor for determining the thickness of the lead wall for shielding against X-rays.

It should be noted that there are techniques which aim to have all of the waste gas irradiated with electron beams at a uniform dose, including those disclosed in the specifications of Japanese Patent Public Disclosure Nos. 49-096975 and 55-097232 and U.S. Pat. Nos. 4,507,265 and 4,596,642, but none of them completely solves the above-described problems.

Further, there is a technique disclosed in the specification of Japanese Patent Public Disclosure No. 61-68128 wherein atmospheric air is introduced into an electron beam irradiation reactor to allow the air to be irradiated with electron beams thereby to form ozone and oxygen atoms therein. The air having ozone and oxygen atoms is mixed with a waste gas to oxidize NO in the waste gas to form $NO_2$ and then the waste gas is introduced to a wet absorption tower to effect desulfurization and denitration.

In the desulfurization and denitration of that technique, since a wet absorption tower is used the absorbing solution used in the wet absorption tower contains a large amount of nitrogen and sulfur compounds which are difficult to treat and costly waste water disposal equipment is therefore needed to treat the absorbing solution. This leads to the problem of high costs in the installation and maintenance thereof.

SUMMARY OF THE INVENTION

Accordingly, the objects of this invention are to provide a novel method and apparatus which solve the above-described problems of the prior art.

These and other objects are achieved according to the present invention by providing a new and improved method and apparatus for treating waste gas by irradiation with electron beams, wherein a part of the waste gas taken from the main stream of waste gas is irradiated with electron beams using a low-voltage type accelerator to form active species such as O and OH radicals in the irradiated waste gas thereby to activate the irradiated waste gas. The activated waste gas then is uniformly fed into the main stream of waste gas and thereby effectively removes noxious gas ingredients such as $SO_2$ and $NO_x$ from the waste gas.

To attain the above-described objects, the present invention provides a waste gas treatment method including irradiating a part of the waste gas which is the object of treatment with electron beams to form active species such as O and OH radicals in the irradiated waste gas; mixing the waste gas having the active species formed therein with the waste gas which is the object of treatment, thereby changing the noxious (gas) ingredients in the waste gas to be treated into the form of a mist or dust by the action of the active species; and capturing the mist or dust.

The present invention also provides a waste gas treatment apparatus including an electron beam irradiation chamber for irradiation with electron beams from an electron beam accelerator; a feeding device which introduces a part of the waste gas to be treated into the electron beam irradiation chamber where the waste gas is irradiated with electron beams thereby to form active species such as O and OH radicals, and which feeds the waste gas having the active species formed therein to a waste gas main duct through which the waste gas to be treated is flowing; a dispersing device for uniformly dispersing in the waste gas main duct the waste gas fed thereinto from the feeding device; and a capturing device for capturing noxious (gas) ingredients in the waste gas within the main duct which have been changed into the form of a mist of dust by the action of the active species.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The following equation represents the part (proportion %) of the waste gas to be treated with electron beams to form active species in the irradiated waste gas $$\frac{\pi/4 \, D^2 \times V \times 3600}{Q} \times 100$$

wherein

D: size of electron beam irradiation chamber (diameter, m), which is set so as to be slightly greater than the maximum range of the electron beams which is mainly determined by the acceleration voltage. It further varies with the density and temperature of the waste gas. It is preferable for this to be about 2.0 m or less, corresponding to an acceleration voltage of about 500 KV or less, because it is then possible to markedly lower the installation cost of the electron beam accelerator and peripheral devices;

V: flow rate of waste gas in the electron irradiation chamber (m/s). This is preferably about 30 m/s or less which is generally adopted for waste gas ducts. If it is greater than about 30 m/s, the degree of pressure drop unfavorably increases;

Q: the amount of waste gas to be treated ($m^3/h$)

The following Table 2 shows the relationship between accelerating voltage, size of the electron beam irradiation chamber and flow rate of waste gas.

TABLE 2

| Accelerating voltage (KV) | D (m) Size of electron beam irradiation chamber (diameter) | V (m/s) Flow rate of waste gas |
|---|---|---|
| 1000 | max. 5.0 | max. 30 |
| 800 | max. 3.7 | max. 30 |
| 500 | max. 2.0 | max. 30 |
| 300 | max. 1.0 | max. 30 |
| 200 | max. 0.6 | max. 30 |

Figure 1:
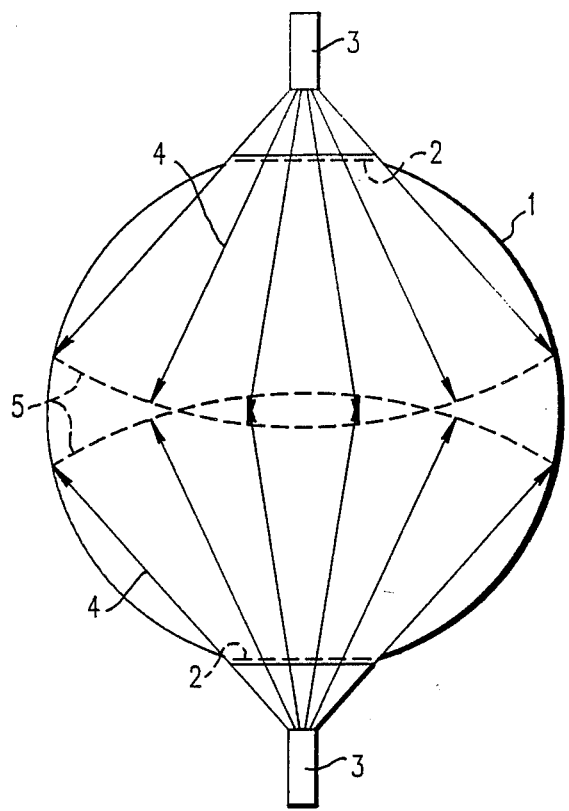
FIG. 1 is a schematic illustration of the structure of an electron beam irradiation portion of a conventional waste gas treatment apparatus.
Figure 2:
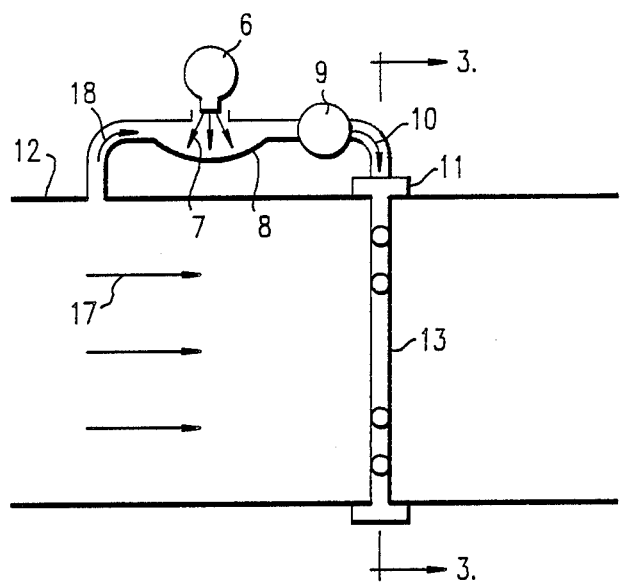
FIG. 2 is a schematic illustration of a waste gas treatment apparatus for carrying out the waste gas treatment method according to the present invention.
Figure 3:
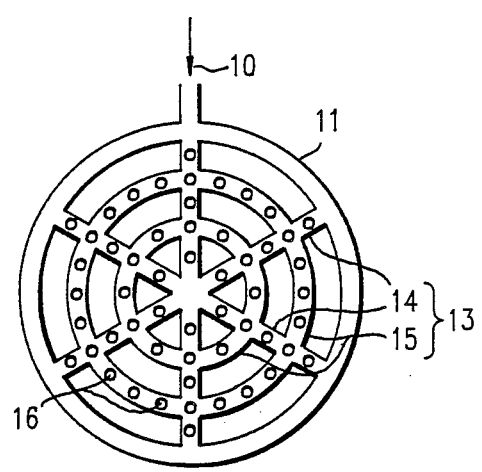
FIG. 3 is a cross-sectional view taken along the line X—X of FIG. 2.

Referring now to the drawings, wherein like reference numerals designate identical or corresponding parts throughout the several views, FIG. 2 schematically shows the structure of a waste gas treatment apparatus for carrying out the waste gas treatment method according to the present invention, while FIG. 3 is a sectional view taken along the line X—X of FIG. 2.

An electron beam irradiation chamber 8 for irradiation with electron beams 7 from an electron beam accelerator 6 is disposed in the vicinity of a waste gas main duct 12 through which waste gas 17 flows. The distance from the electron beam irradiation opening of the electron beam accelerator 6 to the wall surface of the electron beam irradiation chamber 8 is set so as to be slightly greater than the maximum range of the electron beams 7. One end of the electron beam irradiation chamber 8 is communicated with a waste gas main duct 12, while the other end thereof is communicated with a dispersing device 13 set within the main duct 12 through a suction transfer blower 9 and a pipe line 10. The dispersing device 13 includes a plurality of radial tubes 14 disposed so as to extend radially from the central portion of the main duct 12 and concentric tubes 15 disposed concentrically, the radial tubes 14 and the concentric tubes 15 communicating with each other and also communicating with the pipe line 10. Each of the radial and concentric tubes 14 and 15 has a multiplicity of small bores 16 so formed as to face downstream of the flow of waste gas 17. It should be noted that the suction transfer blower 9 and the pipe line 10 constitute in combination a feeding device for feeding the air from the electron beam irradiation chamber 8 to the dispersing device 13.

By virtue of the above-described arrangement of the waste gas treatment apparatus, the waste gas 18 sucked into the electron beam irradiation chamber 8 from the waste gas main duct is irradiated with the electron beams 7 from the electron beam accelerator 6, so that oxygen and water in the waste gas are formed into active species such as O and OH radicals. The waste gas having the active species formed therein is supplied to the dispersing device 13 through the pipe line 10 by means of the suction transfer blower 9, and in the dispersing device 13 the waste gas is uniformly dispersed into and mixed with the waste gas 17 within the main duct 12. As a result, the active species such as O and OH radicals act on noxious (gas) ingredients such as $SO_2$ and $NO_x$ in the waste gas 17 to change such noxious (gas) ingredients into the form of mist (sulfuric acid, nitric acid, etc.). If an appropriate amount of ammonia gas is injected from a part (not shown) of the pipe line 10, the mist and the ammonia gas react with each other to form dust (ammonium sulfate, ammonium nitrate, etc.). By capturing the mist and dust by means of a dust collector (not shown) such as an electrostatic precipitator, a bag filter, an active carbon separator. etc., all of which are conventional, it is possible to remove noxious (gas) ingredients such as $SO_2$ and $NO_x$ from the waste gas 17.

Figure 4:
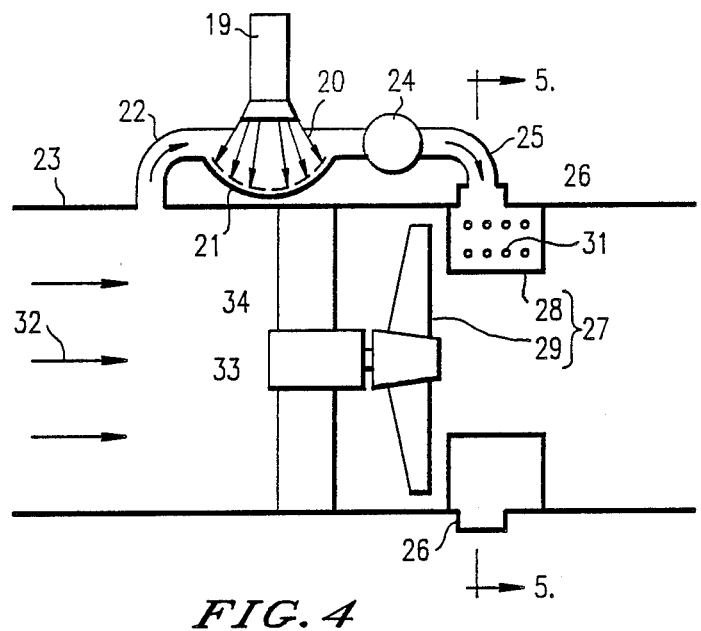
FIG. 4 is a schematic illustration of another waste gas treatment apparatus for carrying out the waste treatment method according to the present invention.
Figure 5:
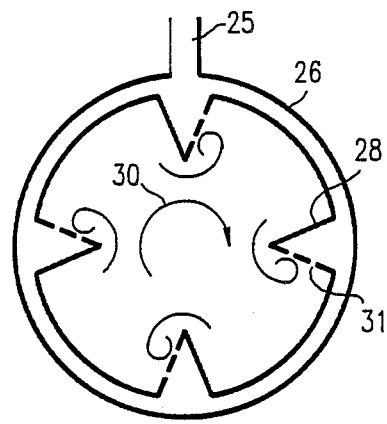
FIG. 5 is a cross-sectional view taken along the line Y—Y of FIG. 4.

FIG. 4 schematically shows the structure of another waste gas treatment apparatus for carrying out the waste gas treatment method according to the present invention, while FIG. 5 is a sectional view taken along the line Y—Y of FIG. 4.

An electron beam irradiation chamber 21 is disposed in the vicinity of a waste gas main duct 23. One end of the electron beam irradiation chamber 21 is communicated with the waste gas main duct 23 through a pipe line 22, while the other end thereof is communicated with a dispersing device 27 through a suction transfer blower 24, a pipe line 25 and an annular passage 26. The electron beam irradiation chamber 21 is provided with an electron beam accelerator 19. The distance from the electron beam irradiation opening of the electron beam accelerator 19 to the wall surface of the electron beam irradiation chamber 21 is set so as to be slightly greater than the maximum range of electron beams 20.

The dispersing device 27 includes a plurality of fins 28 that communicate with the annular passage 26 and blades 29 which are so disposed as to face the fins 28 and which rotate in the direction of the arrow 30. Each fin 28 has a multiplicity of small bores 31 formed in the reverse side thereof as viewed from the direction of the arrow 30, so that the vortex of waste gas 32 caused by the rotation of the blades 29 allows the waste gas irradiated with electron beams and delivered from the electron beam irradiation chamber 21 to be uniformly dispersed into and mixed with the waste gas 32. It should be noted that, in the figures, the reference numeral 33 denotes a motor for rotating the blades 29, while the numeral 34 denotes a support member for supporting the motor 33 within the waste gas main duct 23.

It should be noted that although in the above described example the blades 29 are rotated by the motor 33, the arrangement may, of course, be such that the driving section, for example, a motor, for rotating the blades 29 is provided outside the waste gas main duct 23 and the rotational force from the driving section is transmitted by appropriate rotational force transmission means, for example, gears, chain or belt.

By virtue of the above-described arrangement of the waste gas treatment apparatus, a part of the waste gas sucked in from the waste gas main duct 23 through the pipe line 22 is irradiated with the electron beams 20 from the electron beam accelerator 19, so that oxygen and water in the waste gas are formed into active species such as O and OH radicals in completely the same way as in the above-described example (the example shown in FIG. 2). The waste gas having the active species formed therein is dispersed into and mixed with the waste gas 32 in the waste gas main duct 23 through the dispersing device 27. As a result, the active species act on noxious (gas) ingredients in the waste gas 32 to form mist or dust. Thus it is possible to capture the mist or dust by means of a dust collector such as an electrostatic precipitator, a bag filter, an active carbon separator, etc., all of which are conventional.

It should be noted that the structures of the waste gas treatment apparatus shown in FIGS. 2 to 5 are one embodiment of the present invention and that the present invention is not necessarily limited thereto. In short, each section of the waste gas treatment apparatus may have any specific disposition and structure, provided that the apparatus is arranged such that an electron beam irradiation chamber for irradiation with electron beams from an electron beam accelerator is provided in the vicinity of a main duct for waste gas; a part of the waste gas to be treated is introduced into the electron beam irradiation chamber where waste gas is irradiated with electron beams thereby to form active species such as O and OH radicals; the waste gas having the active species formed therein is fed into the waste gas main duct by means of a feeding device; the waste gas fed into the waste gas main duct is dispersed into and mixed with the waste gas flowing through the main duct by means of a dispersing device, thereby changing noxious (gas) ingredients in the waste gas into the form of a mist or dust by the action of the active species; and the mist or dust is captured by means of a capturing device a duct collector such as an electrostatic precipitator, a bag filter, an active carbon separator, etc., all of which are conventional.

As has been described above, according to the present invention, a part of a waste gas is taken and irradiated with electron beams to form active species in the waste gas to thereby activate it, and the activated waste gas is then mixed with the gas which is the object of treatment, thereby changing noxious (gas) ingredients in the waste gas into the form of a mist or dust. Therefore, it is unnecessary to irradiate directly all of the waste gas as in the prior art, and even if the amount of waste gas increases to the extent that would be expected if the treatment is applied on a practical scale and the size of the waste gas duct increases correspondingly, it is unnecessary to dispose a multiplicity of electron beam accelerators and raise the acceleration voltage. Accordingly, it is possible to markedly lower the installation cost of an electron beam accelerator and peripheral devices. For example, in the conventional arrangement wherein electron beams are directly applied to waste gas, it has heretofore been necessary to set the acceleration voltage of the electron beam accelerators at a high level, i.e., 800 kV or 1,000 kV, in order to obtain satisfactory electron beam energy in relation to the waste gas duct size or the like for the purpose of uniformly forming active species in the waste gas, whereas, in the case of the present invention, an electron beam accelerator with an acceleration voltage of about 500 kV of less suffices and it is therefore possible to markedly lower the installation cost of the electron beam accelerator and peripheral devices.

Further, in the method and apparatus for treating waste gas by irradiation with electron beams according to the subject invention, the noxious ingredients in the waste gas are changed into the form of a mist or dust by the action of the active species (O and OH radicals, etc.) and the mist or dust is captured by means of a conventional capturing device. Accordingly, the present invention differs from the case of using a wet absorption tower, as previously described, which requires treatment of the waste water emanating from the absorbing solution used in the wet absorption tower, allowing the costs of installation and maintenance to thus be lowered in the present invention.

Furthermore, in the present invention, since a part of the waste gas is taken and irradiated with electron beams, there is no increase in the volume of waste gas even when the waste gas irradiated with electron beams is mixed with the waste gas flowing through the main duct, compared with the case wherein air which is externally taken in is irradiated with electron beams. Thus the present invention has no necessity for a large-capacity blower.

However, if an increase in the volume of total gas and some decrease in the efficiency of desulfurization and denitration is not a significant problem, and can be permitted, and if air is favorably taken in and irradiated with electron beams, air instead of a part of waste gas may be taken in.

Next, the present invention will be described more specifically by way of Example. However, the present invention is in no way restricted by the Example.

EXAMPLE

Waste gas (20,000 Nm³/h) containing $SO_2$ (200 ppm) and $NO_x$ (180 ppm) was cooled down to 70° C. and then a part of the waste gas was introduced into an irradiation chamber where it was irradiated with electron beams to form active species. The waste gas containing these active species was returned to the main waste gas duct, and the mixed waste gas was passed through said main duct and introduced into an electrostatic precipitator where the resulting dust was separated and the treated gas released into the atmosphere. An experimental operation was carried out for about 150 hours. The operating conditions, the part (proportion %) of the waste gas to be treated with electron beams and the rates of desulfurization and denitration are shown in Table 3.

Thus, in the method of and apparatus for treating waste gas by irradiation with electron beams according to the present invention, noxious (gas) ingredients such as $SO_2$ and $NO_x$ in waste gas are changed into the form of a mist (sulfuric acid and/or nitric acid) or dust (ammonium sulfate and/or ammonium nitrate) and the resulting mist or dust is then captured with a dust collector or the like. Accordingly, the method and apparatus of the present invention are suitable for utilization in treating waste gas such as boiler combustion waste gas in thermoelectric power plants that use fossil fuels, for example, heavy oil or coal, as a fuel or in sintering waste gas in iron works.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of treating waste gas flowing in a main duct by irradiation with electron beams, comprising:
   separating a part of said waste gas from said main duct into an electron beam irradiation chamber;
   irradiating the part of the waste gas separated in said separating step in said irradiation chamber to form active species in the separated irradiated waste gas, wherein the amount of the waste gas separated in said separating step as a percentage of the waste gas in said main duct is defined by the following equation:

$$\frac{\pi/4\ D^2 \times V \times 3600}{Q} \times 100$$

wherein D is the diameter of an electron beam irradiation chamber, that is, about 2.0 m or less corresponding to an accelerating voltage of about 500 KV or less, V is the flow rate of waste gas in the electron beam irradiation chamber of about 30 m/s or less, Q (m³/h) is the amount of waste gas to be treated flowing in said main duct;
   mixing in main duct the separated and irradiated waste gas having said active species formed therein with said waste gas to be treated flowing in the main duct, thereby changing noxious gaseous ingredients in said waste gas flowing in the main duct into the form of mist or dust by the action of said active species; and
   capturing said mist or dust by means of a dust collector.

2. An apparatus for treating waste gas flowing in a main duct by irradiation with electron beams, comprising:

TABLE 3

| Part (proportion %) of waste gas | Amount of waste gas to be irradiated | Accelerating voltage (KV) | Electron beam output (KW) | Average absorbed dose (Mrad) | Diameter of irradiation chamber (m) | Flow rate of waste gas in irradiation chamber (m/s) | Desulfurization (%) | Denitration (%) | Thickness of lead wall for x-ray shielding (mm) |
|---|---|---|---|---|---|---|---|---|---|
| 100 | 20,000 | 1000 | 108 | 1.5 | 4.4 | 0.37 | 90 | 80 | 193 |
| 53 | 10,600 | 800 | 108 | 1.5 | 3.2 | 0.37 | 90 | 80 | 157 |
| 15 | 3,000 | 500 | 108 | 1.5 | 1.7 | 0.37 | 90 | 75 | 85 |
| 4.2 | 840 | 300 | 108 | 1.5 | 0.9 | 0.37 | 90 | 75 | 32 |
| 1.3 | 260 | 200 | 108 | 1.5 | 0.5 | 0.37 | 90 | 70 | 13 | an electron beam irradiation chamber including at least one electron beam accelerator for irradiation of the interior of said chamber with electron beams;

separating means for separating a part of the waste gas to be treated from said main duct and feeding the separated part of the waste gas into said electron beam irradiation chamber where said separated part of the waste gas is irradiated with electron beams thereby to form active species, and for feeding the separated and irradiated waste gas having said active species formed therein back to said waste gas main duct through which said waste gas to be treated is flowing, wherein the amount of the waste gas separated from the main duct as a percentage of the waste gas flowing in the main duct is defined by the following equation:

$$\frac{\pi/4\, D^2 \times V \times 3600}{Q} \times 100$$

wherein D is the diameter of an electron beam irradiation chamber, that is, about 2.0 m or less corresponding to an accelerating voltage of about 500 KV or less, V is the flow rate of waste gas in the electron beam irradiation chamber of about 30 m/s or less, and Q (m³/h) is the amount of waste gas to be treated flowing in the main duct;

dispersing means for uniformly dispersing in the main duct separated and irradiating waste gas having said active species formed therein fed from said separating means, thereby changing noxious gaseous ingredients in said waste gas flowing in said main duct into the form of mist or dust by the action of said active species; and dust collector means for capturing the mist or dust into which noxious gaseous ingredients in the waste gas within the main duct have been changed by the action of said active species.

3. A method as defined in claim 1, wherein the diameter of the electron beam irradiation chamber is about 1.7 m or less.

4. A method as defined in claim 1, wherein the amount of the waste gas separated in said separating step as a percentage of the waste gas in said main duct is about 15 percent of less.

5. A method as defined in claim 1, wherein the amount of the waste gas separated in said separating step is about 340,000 m³/h and the amount of the waste gas to be treated in said main duct is about 2,270,000 m³/h.

* * * * *